United States Patent
Dugas et al.

(10) Patent No.: US 12,157,574 B2
(45) Date of Patent: Dec. 3, 2024

(54) INTERIOR LAYOUT OF AN AIRCRAFT CABIN AND ASSOCIATED METHOD

(71) Applicant: DASSAULT AVIATION, Paris (FR)

(72) Inventors: Quentin Dugas, Saint Cloud (FR); Jean-Rémi Billon, Saint Cloud (FR)

(73) Assignee: DASSAULT AVIATION, Paris (FR)

( * ) Notice: Subject to any disclaimer, the term of this patent is extended or adjusted under 35 U.S.C. 154(b) by 523 days.

(21) Appl. No.: 17/500,028

(22) Filed: Oct. 13, 2021

(65) Prior Publication Data
US 2022/0119117 A1 Apr. 21, 2022

(30) Foreign Application Priority Data
Oct. 15, 2020 (FR) .................. FR 20 10543

(51) Int. Cl.
*B64D 11/06* (2006.01)

(52) U.S. Cl.
CPC ...... *B64D 11/0605* (2014.12); *B64D 11/0601* (2014.12); *B64D 11/064* (2014.12); *B64D 11/0648* (2014.12)

(58) Field of Classification Search
CPC ............ B64D 11/0605; B64D 11/0638; B64D 11/0601; B64D 11/0602; B64D 11/064; B64D 11/0648; B60N 3/001; A47B 83/02; A47B 83/021; A47B 83/0213; A47B 39/00; A47B 39/02; A47B 39/023; A47B 11/00; A47B 9/20; A47C 9/022
USPC ........ 108/64, 147, 139, 141; 297/170, 174 R
See application file for complete search history.

(56) References Cited

U.S. PATENT DOCUMENTS

| | | | | |
|---|---|---|---|---|
| 1,944,765 A | * | 1/1934 | Sheldon | A47C 9/022 297/142 |
| 3,224,391 A | * | 12/1965 | Cooper | A47B 13/081 108/140 |
| 4,130,070 A | * | 12/1978 | Herrin | A47B 13/081 108/143 |
| 4,836,114 A | * | 6/1989 | Cohen | A47B 13/023 108/77 |

(Continued)

FOREIGN PATENT DOCUMENTS

KR 200444081 Y1 4/2009

OTHER PUBLICATIONS

Spruce, Terry; Jet Aviation Adds First ACJ318 to US Fleet; CorporateJetInvestor; Oct. 31, 2013; <https://www.corporatejetinvestor.com/news/jet-aviation-adds-first-acj318-to-us-fleet/#>. (Year: 2013).*

(Continued)

*Primary Examiner* — Christopher D Hutchens
*Assistant Examiner* — Michael A. Fabula
(74) *Attorney, Agent, or Firm* — Davidson Kappel LLC

(57) ABSTRACT

An interior layout of an aircraft cabin extends along a longitudinal axis on a floor and comprises a table having at least one leg, at least one base for each leg and at least one flat tabletop. Each base is intended to be fixed to the floor, each leg is mounted on a base, and each flat tabletop is mounted on at least one leg. The table defines at least one main aisle accessible to a passenger of the aircraft. The main aisle extends in the longitudinal axis along a longitudinal edge of the flat tabletop. The interior layout comprises at least one seat arranged opposite the table. The seat has a seating direction oriented transversely to the longitudinal axis.

15 Claims, 8 Drawing Sheets

(56) References Cited

U.S. PATENT DOCUMENTS

| | | | | |
|---|---|---|---|---|
| 5,144,898 | A * | 9/1992 | Posly | A47B 23/046 |
| | | | | 108/148 |
| 5,701,826 | A * | 12/1997 | Dodgen | B60N 3/001 |
| | | | | 297/173 |
| 6,598,542 | B2 * | 7/2003 | Goldberg | A47B 87/002 |
| | | | | 403/113 |
| 6,899,385 | B2 * | 5/2005 | Pernicka | A47B 83/02 |
| | | | | 297/344.21 |
| 8,915,198 | B2 * | 12/2014 | Massimini | A47B 13/088 |
| | | | | 108/69 |
| 10,939,757 | B1 * | 3/2021 | Samikkannu | A47C 9/022 |
| 10,980,338 | B1 * | 4/2021 | Marion | A47B 13/081 |
| 2009/0249982 | A1 | 10/2009 | Palethorpe | |
| 2011/0210205 | A1 | 9/2011 | Bock et al. | |
| 2012/0319437 | A1 * | 12/2012 | Conner | A47C 3/12 |
| | | | | 297/142 |
| 2014/0060395 | A1 * | 3/2014 | Ruiter | A47B 97/00 |
| | | | | 108/50.02 |
| 2018/0116391 | A1 * | 5/2018 | Decker | B64D 11/0627 |
| 2019/0233115 | A1 | 8/2019 | Malek et al. | |
| 2019/0344894 | A1 * | 11/2019 | Bang | B64D 11/064 |
| 2021/0059411 | A1 * | 3/2021 | Samikkannu | A47B 83/0213 |
| 2021/0107656 | A1 * | 4/2021 | Vandewall | B64D 11/0015 |
| 2021/0114731 | A1 * | 4/2021 | Guthrie | B64D 11/0643 |
| 2021/0177141 | A1 * | 6/2021 | Samikkannu | A47B 83/0213 |
| 2021/0307548 | A1 * | 10/2021 | Raghoonandan | B60N 3/102 |
| 2023/0021185 | A1 * | 1/2023 | Guthrie | B64D 11/00 |

OTHER PUBLICATIONS

Denton, Jeremy; Photograph of Airbus A320-232 Registration CS-TFY; JetPhotos.com; Jul. 6, 2018; <https://www.jetphotos.com/photo/8998120>. (Year: 2018).*

Ermolenko, Dana; RusJet to Help Market Sukhoi Business Jet; 50Skyshades.com; Sep. 16, 2018; <https://50skyshades.com/news/events-festivals/rusjet-to-help-market-sukhoi-business-jet>. (Year: 2018).*

Search Report for priority application FR 2010543.

* cited by examiner

INTERIOR LAYOUT OF AN AIRCRAFT CABIN AND ASSOCIATED METHOD

The present disclosure relates to an interior layout of an aircraft cabin extending along a longitudinal axis of the aircraft on a floor of the aircraft, the interior layout comprising a table comprising:
- at least one leg;
- at least one base for each leg; and
- at least one flat tabletop;

each base being intended to be fixed to the floor, each leg being mounted on a base, each flat tabletop being mounted on at least one leg and defining at least one bearing surface, the table defining at least one main aisle accessible to a passenger of the aircraft, the main aisle extending along the longitudinal axis along a longitudinal edge of the flat tabletop.

Such an interior layout is intended to be installed in an aircraft cabin to contribute to the comfort of the cabin occupants, particularly in a business jet.

During a cruising flight in a business jet, the passengers of an aircraft want to have a table to perform various activities, such as working, eating, or more generally to support various objects, such as portable electronic devices.

BACKGROUND

Known interior layouts include a table, for example, which can be retracted into the fuselage and which extends laterally, i.e. perpendicular to the longitudinal axis of the aircraft, in its deployed position.

In such an interior layout, the seats are thus arranged laterally next to each other along the table and are oriented with a seating direction along the longitudinal axis of the aircraft in the direction of travel or in the opposite direction. For example, an aisle is provided at the end of the table to allow for the evacuation of occupants.

To increase the number of occupants who can simultaneously use the table, the seats are, for example, aligned from the fuselage towards the free edge of the table.

SUMMARY

Such an arrangement is not entirely satisfactory from a practical point of view. This interior layout only provides access to the seats from the end of the table. Thus, access to the seats furthest away from this access is difficult, and usually requires the occupants closest to the end of the table to move to allow the occupants furthest away from the end of the table to move.

In addition, in the event of a hazard within the aircraft, the evacuation of occupants from the seats closest to the fuselage and therefore furthest from the access can be delayed.

In addition, such an interior layout has few rearrangement possibilities, so that it is difficult to adapt to the various situations that may be encountered in an aircraft cabin, for example in the event of a meeting, a meal, to follow a display on a screen, or even to allow passengers to lie down to sleep.

It is therefore an aim of the present disclosure to improve the practicality of an aircraft cabin interior layout, by improving the arrangement and facilitating the modularity of the elements constituting this interior layout.

To this end, the present disclosure provides to an interior layout of the above type comprising at least one seat arranged opposite the table, the seat having a seating direction oriented transversely to the longitudinal axis.

The interior layout according to the present disclosure may comprise one or more of the following features, taken alone or in any combination that is technically possible:
- the bearing surface extends along the longitudinal axis;
- the length of the bearing surface, taken along the longitudinal axis, is greater than its width, taken along an axis perpendicular to the longitudinal axis;
- at least one seat is a couch extending along the longitudinal axis along the fuselage, the couch having a seating direction oriented perpendicular to the longitudinal axis;
- the table comprises at least one first table part and at least one second table part respectively comprising at least one first and one second leg, at least one first and one second base and at least one first and one second flat tabletop part, each flat tabletop part being mounted so as to be able to move translationally on said leg along the longitudinal axis and along a horizontal transverse axis perpendicular to the longitudinal axis, the first flat tabletop part and the second flat tabletop part being movable between a joined position in which they are contiguous so as to form a single continuous bearing surface and a separated position in which they are spaced apart so as to form two bearing surfaces separated by a space defining an auxiliary aisle accessible to a passenger of the aircraft and opening onto the main aisle;
- each table part comprises:
  - at least one longitudinal actuator configured to move the flat tabletop part of said table part in translation along the longitudinal axis of the aircraft relative to the leg, and
  - at least one transverse actuator configured to move the flat tabletop part of said table part in translation along the transverse axis relative to the leg;
- each leg is mounted so as to be translatable on a base along a vertical axis perpendicular to the longitudinal axis, the flat tabletop being translatable along the vertical axis between a high seating position in which the flat tabletop is vertically spaced from the seat along the vertical axis and a low safety position in which the flat tabletop extends below its high position, in a space for receiving an occupant of the seat defined when the flat tabletop is in its high position;
- the table comprises at least one vertical actuator configured to move at least one leg of the table along the vertical axis relative to the base;
- at least one seat is adapted to be moved between:
  - a main aisle occupancy position in which the seat extends substantially into the main aisle, and
  - a main aisle clearance position in which the seat extends away from the main aisle;
- at least one seat comprises a chair, a support rod carrying the chair, and a lower connecting arm for connection to a base of the table, the support rod being mounted on a free end of the lower connecting arm;
- the lower arm is rotatably mounted on said base, around said base;
- the position of the chair relative to the support rod is adjustable in horizontal translation; and
- the support rod is mounted so as to be vertically translatable on the lower connecting arm through the free end of the connecting arm between a lower position in which the lower end of the support rod rests on the floor and an upper position in which the lower end of the support rod is away from the floor.

The present disclosure also relates to a method for setting up an interior layout of an aircraft cabin comprising the following steps:

provliding an interior layout as described above; and displacement of at least one movable seat between its main aisle clearance position and its main aisle occupancy position.

The method according to the present disclosure may comprise one or more of the following features, taken alone or in any combination that is technically possible:

the interior layout is such that the table further comprises at least one first table part and at least one second table part respectively comprising at least one first and one second leg, at least one first and one second base and at least one first and one second flat tabletop part, each flat tabletop part being translatably mounted on said leg along the longitudinal axis and along a horizontal transverse axis perpendicular to the longitudinal axis, the first flat tabletop part and the second flat tabletop part being movable between a joined position in which they are contiguous so as to form a single continuous bearing surface and a separated position in which they are spaced apart so as to form two bearing surfaces separated by a space defining an auxiliary aisle accessible to a passenger of the aircraft and opening onto the main aisle, the method further comprising a step of moving the first flat tabletop part and the second flat tabletop part between the joined position and the separated position;

the interior layout is such that each leg is furthermore mounted so as to be translatable on a base along a vertical axis perpendicular to the longitudinal axis, the flat tabletop being translatable along the vertical axis between a high seating position in which the flat tabletop is vertically spaced from the seat along the vertical axis and a low safety position in which the flat tabletop extends below the high position, in a space for receiving an occupant of the seat defined when the flat tabletop is in its high position, the method further comprising a step of moving the flat tabletop between its high seating position and its low safety position;

the interior layout is such that at least one seat comprises a chair, a support rod carrying the chair and a lower connecting arm for connection to a base of the table, the support rod being mounted on a free end of the lower connecting arm, the support rod further being mounted so as to be vertically translatable on the lower connecting arm through the free end between a lower position in which the lower end of the support rod rests on the floor and an upper position in which the lower end of the support rod is away from the floor, the method further comprising a step of moving the support rod between its lower and upper positions.

The present disclosure also relates to a layout assembly in an aircraft cabin extending on a floor of the aircraft comprising:

a table comprising at least one leg, at least one base for each leg, and at least one flat tabletop, each base being intended to be fixed to the floor, each leg being mounted on a base, each flat tabletop being mounted on at least one leg and defining at least one bearing surface, the layout assembly comprising at least one seat comprising a chair, a support rod carrying the chair, and a lower connecting arm for connection to a base of the table, the support rod being mounted on a free end of the lower connecting arm.

The layout assembly does not necessarily comprise the following features:

at least one seat is arranged opposite the table;

the seat has a seat direction transverse to the longitudinal axis;

the table defines at least one main aisle accessible to a passenger of the aircraft; and the main aisle extends along the longitudinal axis along a longitudinal edge of the flat tabletop.

It may comprise one or more of the above features, or in particular the following features, taken individually or in any technically possible combination:

the lower arm is rotatably mounted on said base, around said base;

the position of the chair in relation to the support rod is adjustable in horizontal translation; and the support rod is mounted so as to be vertically translatable on the lower connecting arm through the free end of the connecting arm between a lower position in which the lower end of the support rod rests on the floor and an upper position in which the lower end of the support rod is away from the floor.

BRIEF SUMMARY OF THE DRAWINGS

The present disclosure will be better understood upon reading the following description, given only as an example, and with reference to the attached drawings, in which.

DETAILED DESCRIPTION

Figure 1:
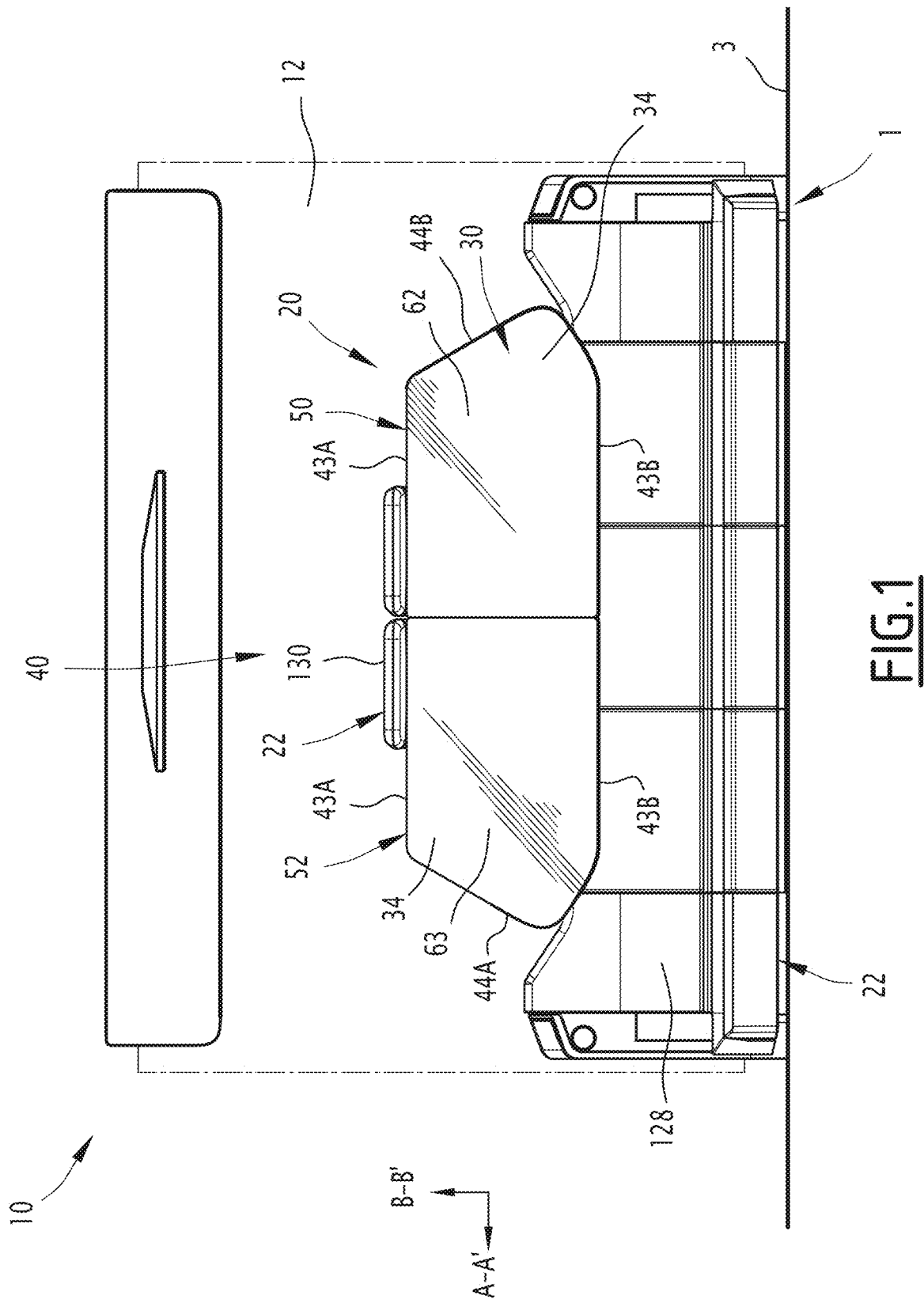
FIG. 1 is a schematic top view of an interior layout according to the present disclosure, with the first flat tabletop part and the second flat tabletop part in a joined position to form a continuous table.

An interior layout 10 of an aircraft cabin according to the present disclosure is illustrated in FIGS. 1 to 8.

The aircraft 1 is, for example, a business jet.

"Business jet" means an aircraft capable of carrying not more than twenty-five passengers, preferably not more than twenty-one passengers. The maximum takeoff weight (MTOW) of the business jet is preferably less than 55,000 kg (121,000 lbs).

The aircraft cabin extends along a longitudinal axis A-A' of the aircraft 1 on a floor 12 of the aircraft 1.

The aircraft cabin is delimited laterally by a fuselage 3, the fuselage 3 also extending along the longitudinal axis A-A'.

The interior layout 10 comprises at least one table 20 and at least one seat 22.

With reference to FIGS. 3 to 6, the table 20 comprises at least one leg 26, 27, at least one base 28 for each leg 26, 27 and at least one flat tabletop 30, carried by the leg 26, 27.

Each base 28 is fixed to the aircraft floor 12 and forms an element for securing the table 20 to the aircraft floor 12.

Each leg 26, 27 is mounted on at least one base 28 and constitutes an element for securing the flat tabletop to the base 28.

Each flat tabletop 30 is mounted on at least one leg 26 and defines a bearing surface 34. The bearing surface 34 extends along a horizontal transverse axis B-B' perpendicular to the longitudinal axis A-A' between a right longitudinal edge 43A and a left longitudinal edge 43B. The bearing surface 34 further extends along the longitudinal axis A-A' between a front transverse edge 44A and a rear transverse edge 44B.

"Longitudinal edge" means that the longitudinal edge 43A, 43B extends substantially parallel to the longitudinal axis A-A'. "Transverse edge" means that the transverse edge 44A, 44B extends substantially transversely to the longitudinal axis A-A'. A transverse edge 44A, 44B connects two longitudinal edges 43A, 43B.

The bearing surface 34 is, for example, intended to carry various objects or to form a surface on which a passenger of the aircraft can rest.

The bearing surface 34 defines at least one main aisle 40 accessible to a passenger of the aircraft and extending along an edge of the flat tabletop 30, as shown in FIG. 1.

In particular, the bearing surface 34 laterally defines at least one main aisle 40 accessible to a passenger of the aircraft and extending along the longitudinal axis A-A' along a right longitudinal edge 43A of the flat tabletop 30. A passenger of the aircraft can easily move in the main aisle 40 to move around the aircraft cabin. The width of the aisle 40, taken along the transverse axis B-B', is thus advantageously greater than 30.5 cm and is preferably between 40.6 cm and 50.8 cm.

Figure 2:
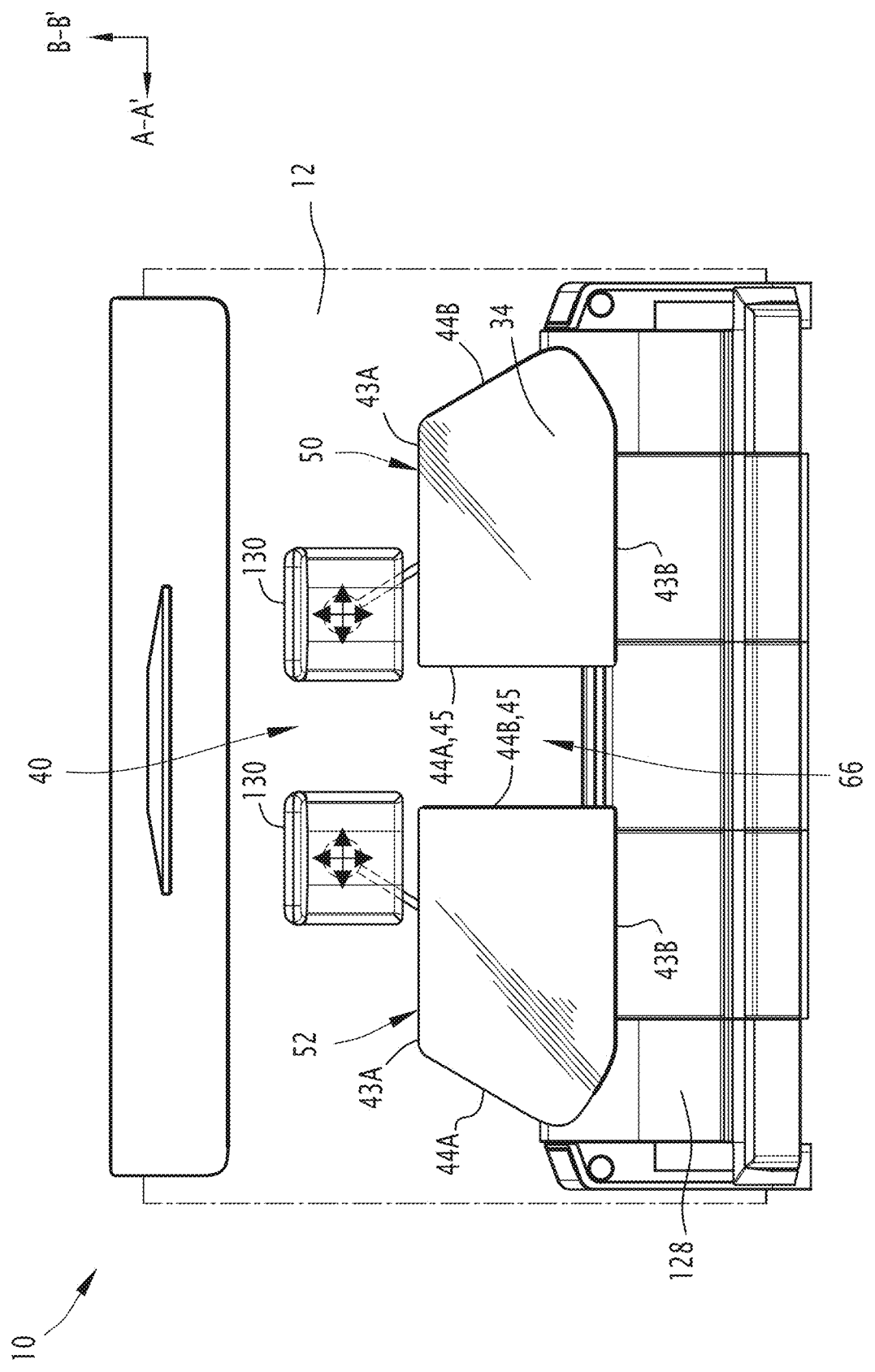
FIG. 2 is a schematic top view of the interior layout of FIG. 1, with the first flat tabletop part and the second flat tabletop part in a separate position with two seats being in a main aisle occupancy position, to allow simplified access to the seats.
Figure 3:
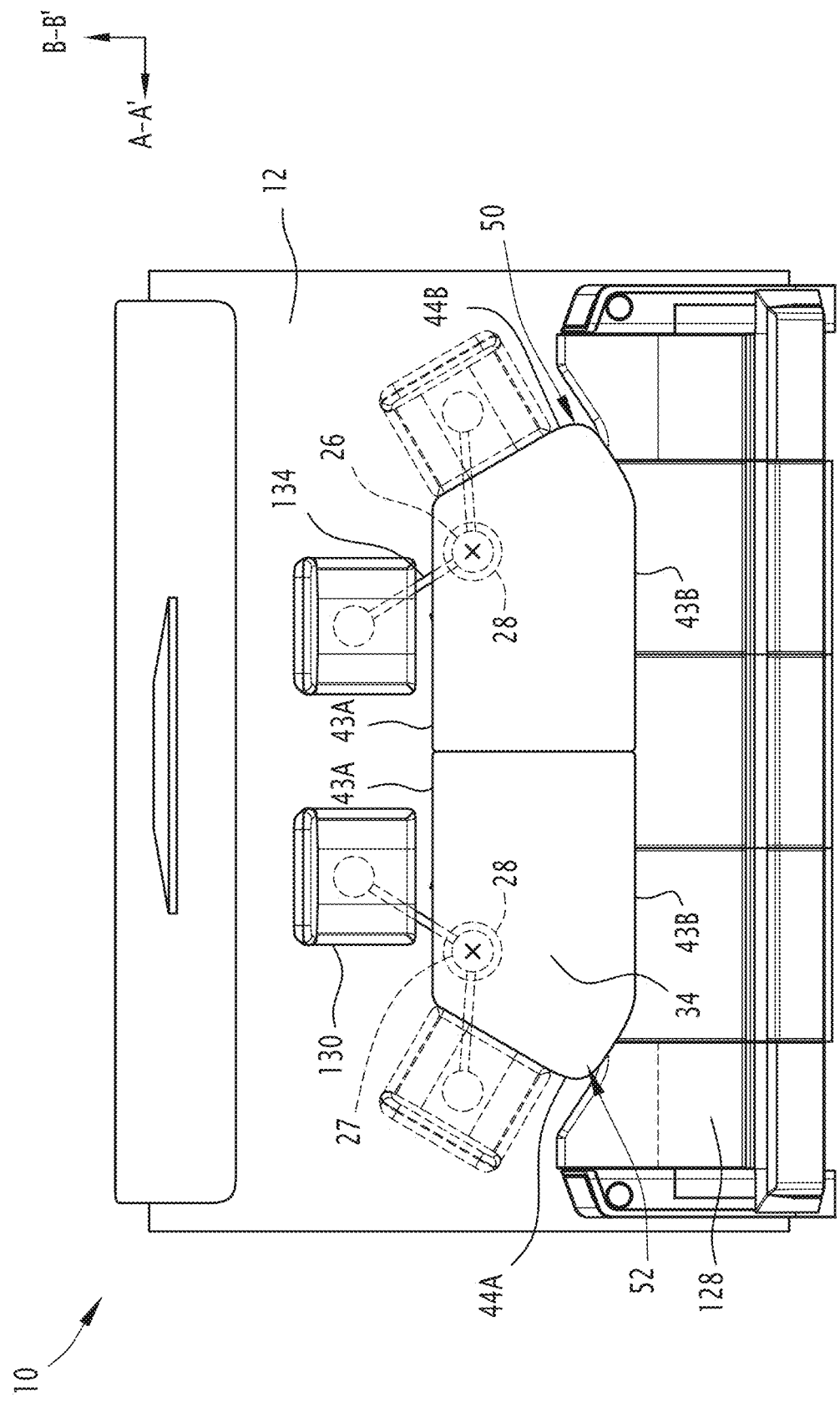
FIG. 3 is a schematic top view of the interior layout of FIG. 1, with the first flat tabletop part and the second flat tabletop part in a joined position with two seats being in a main aisle occupancy position.

With reference to FIGS. 1 to 3, the table 20 comprises at least one first table part 50 and at least one second table part 52 each comprising at least one leg 26, at least one base 28 and each having at least one first and one second flat tabletop part 62, 63 respectively.

Figure 4:
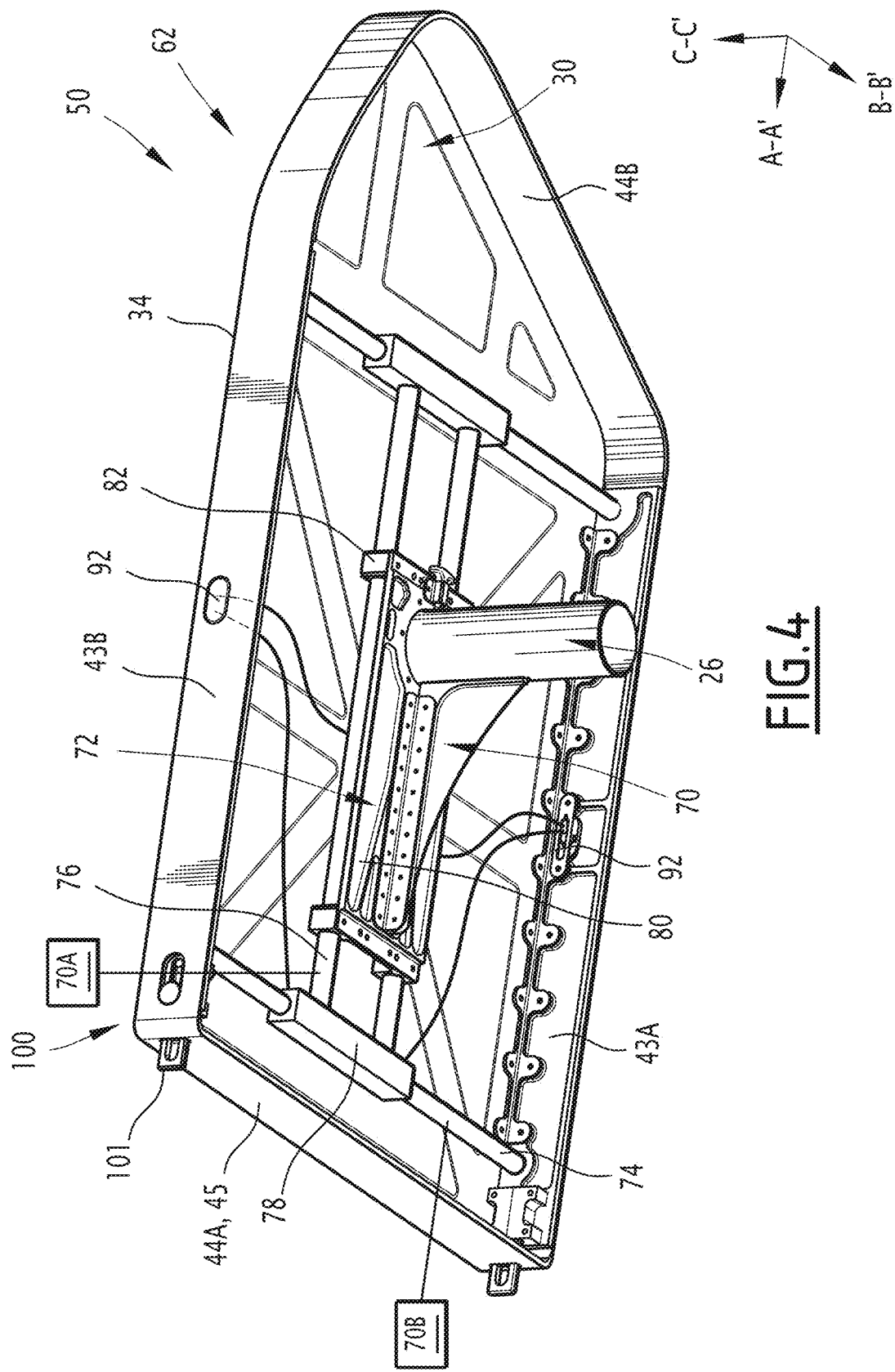
FIG. 4 is a schematic perspective view from a substantially low angle of a table part of the interior layout of FIG. 2.

Each flat tabletop part 62, 63 is mounted on a respective leg 26 for translational movement along the longitudinal axis A-A' and along the transverse axis B-B' by means of a horizontal translation device 70 visible in FIG. 4.

In particular, the first flat tabletop part 62 and the second flat tabletop part 63 are movable between a joined position, visible in FIGS. 1 and 3, in which they are contiguous so as to form a single continuous bearing surface 34 and a separated position, visible in FIG. 2, in which they are spaced apart so as to form two bearing surfaces 34 separated by a space defining an auxiliary aisle 66 accessible to a passenger of the aircraft and opening onto the main aisle 40.

In the joined position, the first flat tabletop part 62 and the second flat tabletop part 63 are arranged such that a front transverse edge 44A of one part 62, 63 abuts a rear transverse edge 44B of the other part 63, 62. The front and rear transverse edges 44A and 44B that abut each other in the joined position are called contact edges 45 (visible in FIGS. 2 and 4).

The auxiliary aisle 66 is thus delimited between the contact edges 45 of each flat tabletop part 62, 63.

With reference to FIG. 2, the auxiliary aisle 66 extends substantially along the transverse axis B-B'.

In the joined position, the total length of the bearing surface 34, taken along the longitudinal axis A-A', is greater than its width, taken along the transverse axis B-B'.

With reference to FIG. 4, the horizontal translation device 70 comprises a body 72 fastened to the leg 26, at least one transverse guide bar 74 connected to the flat tabletop part 62, 63 and at least one longitudinal guide bar 76 connected to the body 72 and integral with the transverse guide bar 74 via a transverse guide carriage 78.

In particular, as shown in FIG. 4, the horizontal translation device 70 comprises, for example, two transverse guide bars 74, two longitudinal guide bars 76 and two opposing transverse guide carriages 78.

The transverse and longitudinal guide bars 74, 76 are, for example, cylindrical.

The body 72 defines a supporting structure for the flat tabletop part 62, 63. It comprises a planar support 80 extending substantially along the longitudinal axis A-A' under the flat tabletop part 62, 63 and attached to the leg 26 and at least one longitudinal guide bracket 82 attached to the planar support 80.

In particular, as shown in FIG. 4, the body 72 comprises four longitudinal guide brackets 82.

Each longitudinal guide bracket 82 receives and guides in translation a longitudinal guide bar 76 along the longitudinal axis A-A'. In particular, each longitudinal guide bar 76 passes through the longitudinal guide bracket 82 and is complementarily received in the longitudinal guide bracket 82 so that transverse movement of the longitudinal guide bar 76 relative to the axis A-A' is prevented. During its longitudinal translation, each longitudinal guide bar 76 slides in each longitudinal guide bracket 82 through which it passes.

In particular, as illustrated in FIG. 4, each longitudinal guide bar 76 is guided by two longitudinal guide brackets 82 located on either side of the body 72.

Each longitudinal guide bar 76 is attached to a transverse guide carriage 78 at each end. In particular, as illustrated in FIG. 4, the two longitudinal guide bars 76 are attached to the same first transverse guide carriage 78 at one end thereof located on one side longitudinally relative to the body 72 and attached to the same second transverse guide carriage 78 at the other end thereof located on another side longitudinally relative to the body 72.

Each transverse guide carriage 78 defines a cylindrical transverse guide slide of a transverse guide bar 74. The cylindrical slide passes through the transverse guide carriage 78 in a direction parallel to the transverse axis B-B'.

The cylindrical slide receives and guides the transverse guide bar 74 along the transverse axis B-B' during its transverse translation. In particular, the transverse guide bar 74 passes through the cylindrical slide and hugs the inner surface of the cylindrical slide. This prevents radial movement of the transverse guide bar 74 relative to the transverse axis B-B'. During its transverse displacement, each transverse guide bar 74 slides in the cylindrical slide through which it passes.

The horizontal translation device 70 further comprises at least one longitudinal actuator 70A arranged to translationally move each longitudinal guide bar 76 relative to the body 72, and thus relative to the leg 26, along the longitudinal axis A-A'.

The horizontal translation device 70 further comprises at least one transverse actuator 70B arranged to translationally move the transverse guide bar 74 relative to the transverse guide carriage 78, and thus relative to the leg 26, along the transverse axis B-B'.

Thus, the longitudinal actuator 70A is configured to translationally move the flat tabletop part 62, 63 along the longitudinal axis A-A' of the aircraft relative to the leg 26, and the transverse actuator 70B is configured to translationally move the flat tabletop part 62, 63 along the transverse axis B-B' relative to the leg 26.

The longitudinal actuator 70A and the transverse actuator 70B comprise, for example, electric motors.

The horizontal translation device 70 further comprises at least a first control element 92 controlling the longitudinal and transverse actuators 70A, 70B so as to translationally move the longitudinal and transverse guide bars 74, 76 in either direction.

As illustrated in FIG. 4, the horizontal translation device 70 comprises two first control elements 92 controlling the longitudinal actuator 70A and the transverse actuator 70B, respectively.

The first control element 92 is, for example, as illustrated in FIG. 4, disposed along a longitudinal edge 43A, 43B of the flat tabletop part 62, 63 so as to be accessible to a passenger of the aircraft. The first control element 92 is, for example, a controller wired to the longitudinal actuator 70A and the transverse actuator 70B and operable by a passenger of the aircraft.

With reference to FIG. 4, the table 20 further comprises a mechanism 100 for securing the first and second table parts 50, 52 together.

The securing mechanism 100 is movable between a secured position in which the first flat tabletop part 62 and the second flat tabletop part 63 are rigidly connected and a disengaged position in which they are free to move relative to each other.

The securing mechanism 100 comprises a hook (not shown) mounted on one of the first and second flat tabletop parts 62, 63 and a hooking element 101 visible in FIG. 4 mounted on the other of the first and second flat tabletop parts 62, 63.

The hooking element 101 is, for example, mounted on the first flat tabletop part 62 and the hook is, for example, mounted on the second flat tabletop part 63.

The hooking element 101 is movable between an attachment position in which it protrudes from the first flat tabletop part 62 (as seen in FIG. 4) and in which the hook is able to attach the hooking element 101 and a retracted position in which it is retracted into an internal space provided in the first flat tabletop part 62.

The hook is, for example, disposed within a cavity provided in the second flat tabletop part 63, the cavity being adapted to receive the hooking element 101 when in its attachment position so that the hook can hook the hooking element 101.

As illustrated in FIG. 4, the hooking element 101 is, in particular, arranged on the contact edge 45 of the first flat tabletop part 62. Advantageously, the hook is arranged on the contact edge 45 of the second flat tabletop part 63 so that it can be placed opposite the hooking element 101 by translation of the first and second flat tabletop parts 62, 63.

Figure 5:
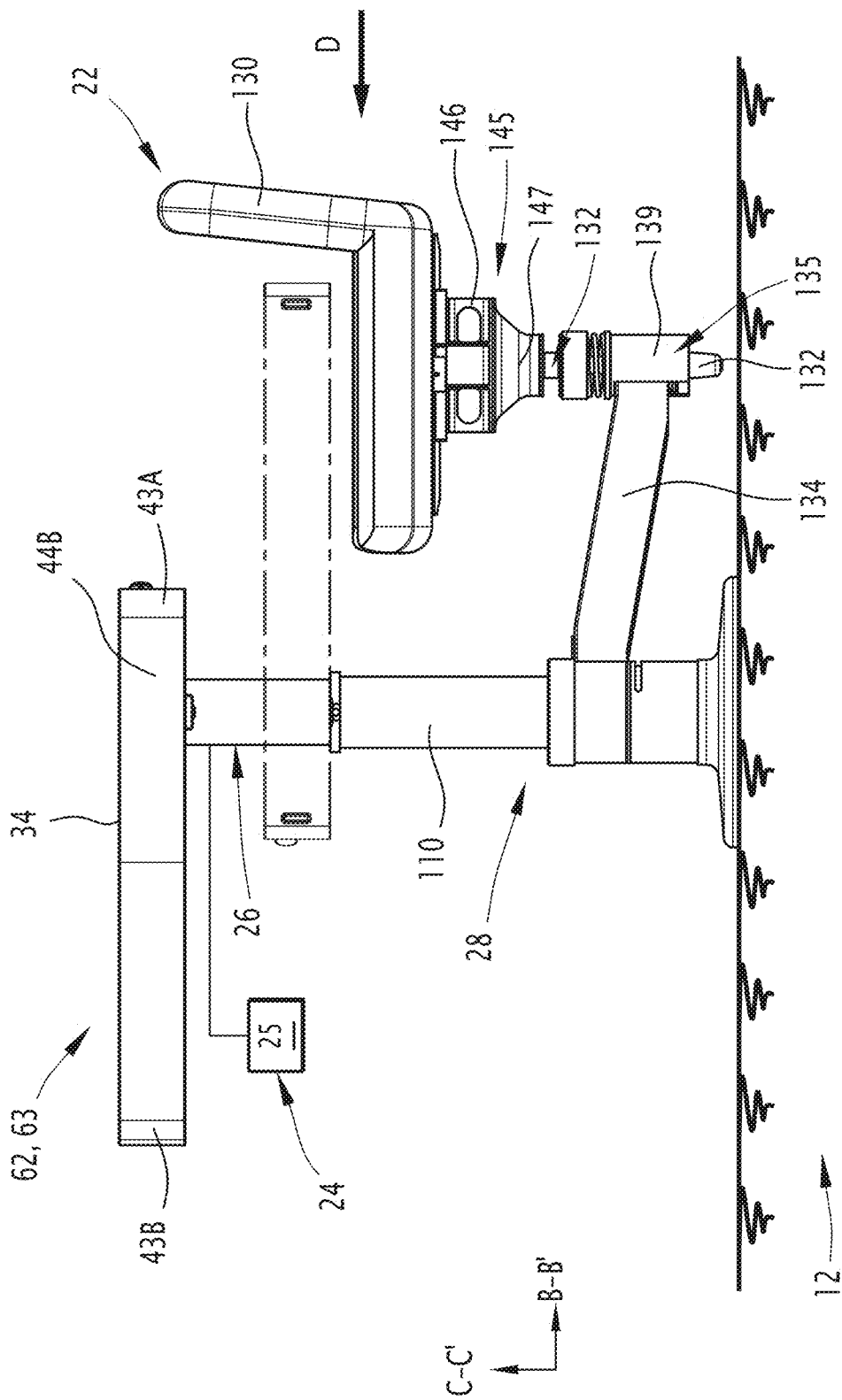
FIG. 5 is a schematic side view of an interior layout according to the present disclosure, with the seat in a main aisle occupancy position.
Figure 6:
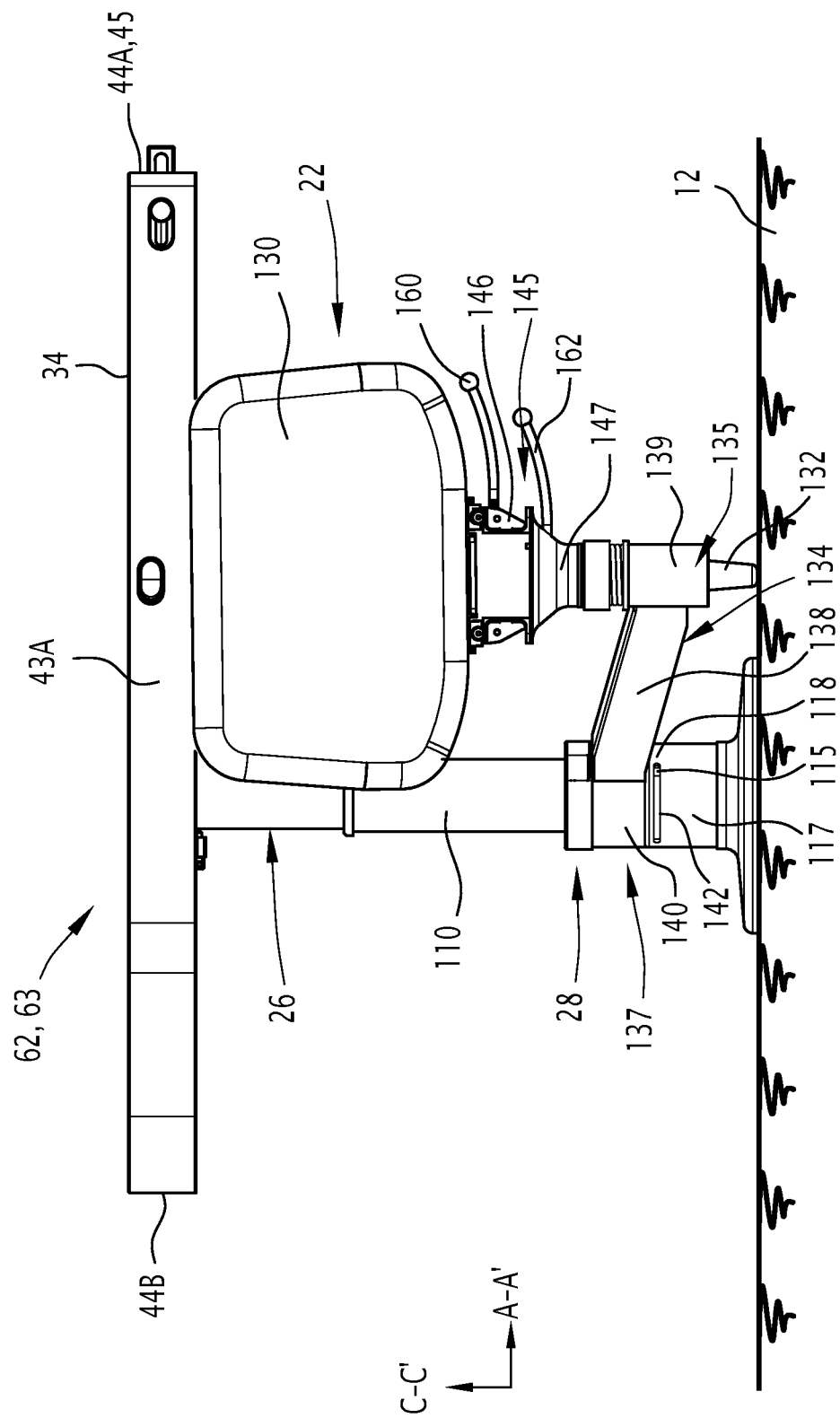
FIG. 6 is a schematic side view of the seat and a table part according to the present disclosure.

With reference to FIGS. 4 to 6, each leg 26 has a tubular shape extending along a vertical axis C-C' perpendicular to the longitudinal A-A' and transverse axes B-B', between a supporting upper end for supporting a flat tabletop part 62, 63 and a resting lower end for resting onto a base 28.

In particular, as shown in FIG. 4, the support end is attached to the planar support 80 of the body 72 of the horizontal translation device 70.

With reference to FIG. 5, each leg 26 is mounted on a base 28 for vertical translation along a direction parallel to the vertical axis C-C' by means of a vertical translation device 24. Thus, each flat tabletop part 62, 63 is translatable along the vertical axis C-C' between a high seating position (visible in solid lines in FIG. 5) and a low safety position (visible in dotted lines in FIG. 5).

In the upper seating position, the flat tabletop part 62, 63 is vertically spaced from the seat 22 along the vertical axis C-C'. In this position, the flat tabletop part 62, 63, a backrest of the seat 22 and a seating surface of the seat 22, on which an occupant of the seat 22 is intended to sit, define an occupant receiving space between them.

In the upper position, the width of the aisle 40 is advantageously greater than or equal to 40.6 cm. The aisle 40 thus provides a sufficiently wide circulation path, which contributes to the comfort of the occupants within the aircraft.

In the low safety position, the flat tabletop part 62, 63 extends below the high position into the occupant receiving space defined in the high position, opposite the backrest and above the seating surface.

In this position, the width of the aisle 40 is advantageously greater than or equal to 30.5 cm. The interior layout 10 thus complies with civil aviation standards.

The vertical translation device 24 comprises at least one vertical actuator 25 arranged to translate the leg 26 relative to the base 28. Thus, the vertical actuator 25 is also arranged to translationally move the flat tabletop part 62, 63 relative to the base 28 between its high seating position and its low safety position.

The vertical actuator 25 comprises, for example, an electric motor.

The vertical translation device 24 further comprises a second (non-illustrated) control element for controlling the vertical actuator 25.

The second control element is, for example, arranged on the outer surface of the leg 26.

The second control element is, for example, a controller wired to the vertical actuator 25 and operable by a passenger of the aircraft.

With reference to FIGS. 5 and 6, each base 28 comprises a hollow vertical tubular support sleeve 110 defining a cylindrical housing for receiving each leg 26. In particular, each leg 26 extends at least partially into the cylindrical housing of the support sleeve 110. In particular, the lower holding end of the leg 26 extends permanently into the cylindrical housing to connect the leg 26 and the base 28.

The outer surface of the leg 26 is intended to conform to the inner surface of the support sleeve 110 so that radial movement of the leg 26 relative to the C-C' axis is prevented. During vertical translation of the leg 26, the leg 26 slides on the inner surface of the cylindrical housing of the support sleeve 110.

The base 28 further comprises a guide support 117 of the seat 22, the shape of which being cylindrical and hollow, extending around the support sleeve 110.

Each leg 26 is retracted into the cylindrical housing of each base 28 when the flat tabletop part 62, 63 is in its low safety position and is extended at least partially out of the cylindrical housing when the flat tabletop part 62, 63 is in its high seating position.

Each leg 26 further comprises a locking mechanism (not shown) movable between a locked position in which the locking mechanism blocks translational movement of the leg

26 along the vertical axis C-C' and an unlocked position in which the locking mechanism allows translational movement of the leg 26 along the vertical axis C-C'.

Figure 7:
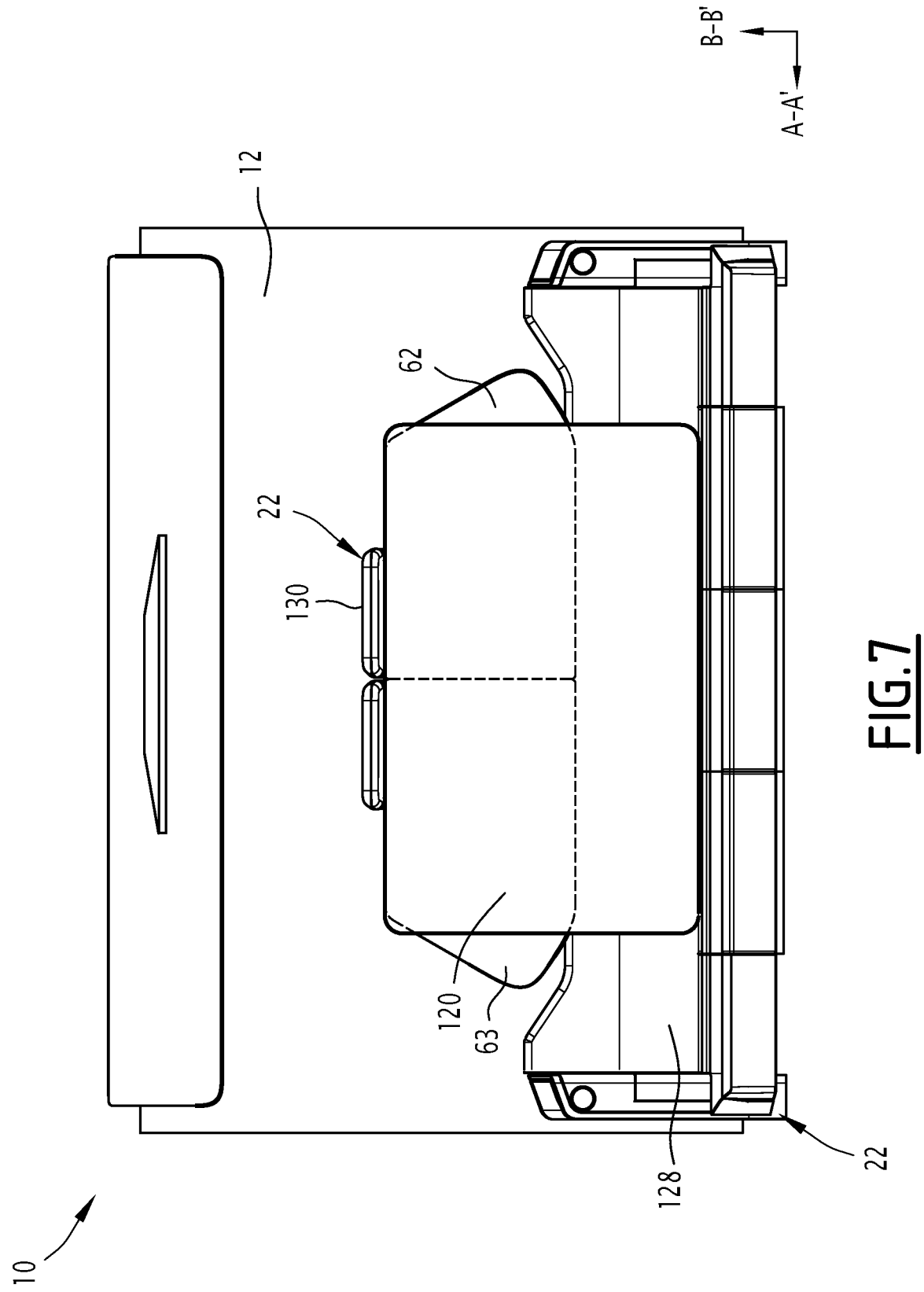
FIG. 7 is a schematic top view of an interior layout according to the present disclosure, in which a bed is arranged on the table.

As shown in FIG. 7, in the low safety position of the flat tabletop parts 62, 63, a bed 120 can be arranged on the table 20.

Figure 8:
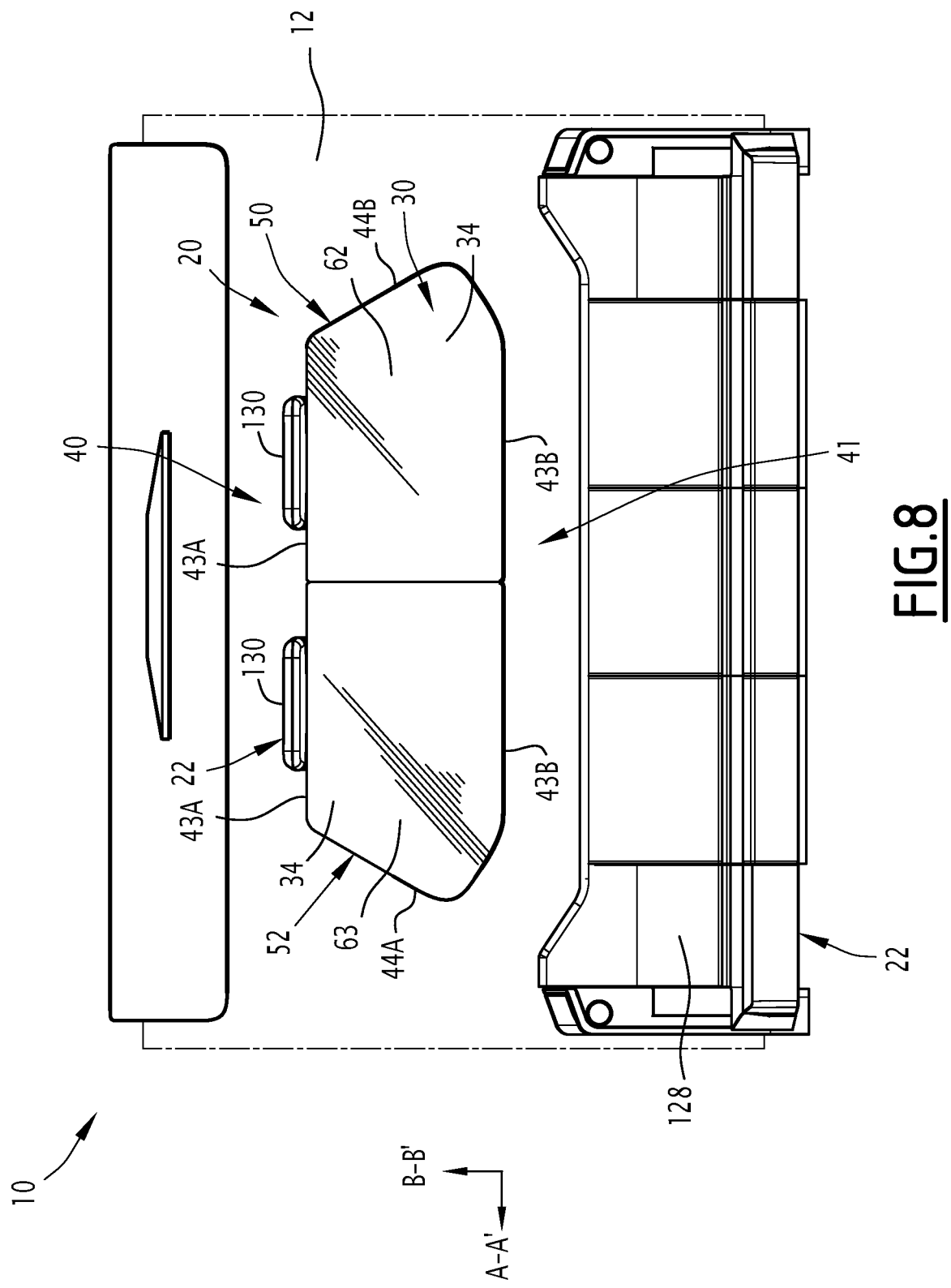
FIG. 8 is a schematic top view of an interior layout according to the present disclosure, with the table being away from the couch and the flat tabletop parts being in a low safety position.

FIG. 8 illustrates a configuration of the interior layout 10 suitable for taxi, take-off and landing (TTOL). In this configuration, the flat tabletop parts 62, 63 are in a low safety position and are spaced from at least one seat 22 on which an occupant is intended to be seated. In this configuration, the bearing surface 34 defines at least one secondary aisle 41 extending along an edge of the flat tabletop 30, as illustrated in FIG. 8. The secondary aisle 41 extends, for example, parallel to the main aisle 40 between the flat tabletop parts 62, 63 and said base 22. The secondary aisle 41 is accessible to a passenger of the aircraft. The width of the secondary aisle 41, taken along the transverse axis B-B', is advantageously greater than 30.5 cm. In this configuration, the lower part of the occupant's body, particularly their legs, is advantageously free.

With reference to FIGS. 1 to 3 and 5 to 8, the interior layout 10 comprises at least two seats 22.

At least one seat 22 is a couch 128 extending in the longitudinal axis A-A' along the aircraft fuselage 3.

In the TTOL configuration shown in FIG. 8, in particular, the flat tabletop parts 62, 63 are spaced apart from the couch 128.

At least one seat 22 comprises a chair 130 mounted so as to protrude under the table 20.

At least one seat 22 has a seating direction which is oriented transversely to the longitudinal axis A-A', here along the transverse axis B-B'. As illustrated in FIGS. 1 to 3 and 5 to 8, in particular, the couch 128 has a seating direction oriented along the transverse axis B-B' at all times. By "seating direction which is oriented transversely to the longitudinal axis" it is meant that an occupant normally seated in the seat 22 will be oriented transversely to a longitudinal axis A-A' of the aircraft, with that person's median sagittal plane preferably perpendicular to the longitudinal axis A-A'.

As illustrated in FIGS. 5 and 6, the seat 22 comprising the chair 130 further comprises a movement support 145 carrying the chair 130, a support rod 132 projecting from the movement support 145 and a lower connecting arm 134 linking the support rod 132 to the leg of the table 20.

As illustrated in FIGS. 3, 5 and 6, the chair 130 is rotatably mounted about a vertical axis relative to the table 20 between a lateral position in which the chair 130 faces a straight longitudinal edge 43A of a flat tabletop part 62, 63 (as illustrated in solid lines in FIG. 3) and a longitudinal position in which the chair 130 faces a transverse edge 44A, 44B of a flat tabletop part 62, 63 (as illustrated in dotted lines in FIG. 3).

The movement support 145 comprises a translation mechanism 146 and a stand 147 for attachment to the support rod 132.

The chair 130 is mounted so as to be translatable on the translation mechanism 146 in a seat movement direction D. The seat movement direction D is comprised in a horizontal plane comprising the longitudinal axis A-A' and the transverse axis B-B'. Thus, the chair 130 is translatable on the translation mechanism 146 relative to the support rod 132. In particular, the position of the chair 130 relative to the support rod 132 is adjustable in horizontal translation, i.e. in the horizontal plane.

With reference to FIG. 5, the chair 130 is thus movable on the translation mechanism 146 in the direction D to, for example, be moved towards or away from the flat tabletop part 62, 63.

The attachment stand 147 is fastened to the support rod 132.

The support rod 132 is mounted on a free end 135 of the lower connecting arm 134. In particular, the support rod 132 is mounted on a guide ring 139 of the free end 135 of the lower arm 134.

The guide ring 139 defines a cylindrical guiding through-cavity extending along the vertical axis C-C'.

The support rod 132 extends in a direction parallel to the vertical axis C-C' between a lower end and an upper end.

The support rod 132 passes vertically through the cylindrical cavity of the guide ring 139 in a direction parallel to the vertical axis C-C'. It is vertically movable between a lower position in which the lower end of the support rod 132 rests on the floor 12 (visible in FIG. 6) and an upper position in which the lower end of the support rod 132 is disposed above and away from the floor 12 (visible in FIG. 5).

The support rod 132 is also rotatably mounted on the hollow guide ring 139. Thus, the chair 130 is also mounted so that it can rotate about a vertical axis with respect to the lower connecting arm 134.

With reference to FIG. 6, the movement support 145 further comprises a first lever 160 and a second lever 162.

The first lever 160 is mounted on the translation mechanism 146 and is arranged to control the horizontal translational movement of the chair 130, for example, along the direction of seat movement D, particularly when the support rod 132 is in the lower position.

The second lever 162 is mounted on the attachment stand 147 and is arranged to control the vertical translational movement and rotational movement of the chair 130 relative to the support rod 132 and the guide ring 139 of the chair 130 when the support rod 132 is in the lower position.

With reference to FIGS. 3, 5 and 6, the lower arm 134 is rotatably mounted on the base 28 of the table 20, about the base 28, so as to move the guide ring 139, the support rod 132 and hence the chair 130 rotatably about the base 28 between its lateral position and its longitudinal position.

In particular, the lower arm 134 comprises, at its end connected to the leg of the table 20, a pivot connection 137 with the base 28 and a member 138 extending radially away from the base 28 from the pivot connection 137 towards the guide ring 139.

The pivot connection 137 comprises a hollow cylindrical sleeve 140, the inner surface of which conforms to the outer surface of the support sleeve 110 of the base 28 around a hinge portion of the support sleeve 110. Rotation of the sleeve 140 around the support sleeve 110 causes rotation of the member 138 and thus of the guide ring 139.

With reference to FIG. 6, the pivot connection 137 comprises a guide stop 115 extending radially from the outer surface of the hollow cylindrical sleeve 140.

The guide support 117 comprises at least one skirt 118 at least partially covering the hollow cylindrical sleeve 140.

The skirt 118 of the guide support 117 defines a groove 142 for the rotational stop of the pivot connection 137. The stop groove 142 is continuous and extends orthoradially across the skirt 118 of the guide support 117 between a first end and a second end.

The guide stop 115 extends into the groove 142 and is rotatably displaced within the guide groove 142 between its first end and its second end when the chair 130 is moved between its longitudinal position and its lateral position.

Thus, the first end and the second end define complementary stops limiting the rotational movement of the guide stop 115 and thus of the chair 130.

The chair 130 is adapted to be rotated about the base 28 between a main aisle occupancy position in which the chair 130 extends substantially into the main aisle 40 as shown in FIGS. 2 and 5 and in FIG. 3 in solid line, and a main aisle clearance position in which the chair 130 extends away from the main aisle 40 as shown in FIGS. 1 and 7.

A particular position of the clearance position called the meeting position is shown in FIG. 3 in dotted lines. In the meeting position, the chair 130 is rotated relative to the guide ring 139 and is disposed at a longitudinal end of the table 20 opposite a transverse edge 44A, 44B. The chair 130 may also be oriented substantially away from the couch 128 so that the occupants of the chair 130 and the couch 128 have, for example, a common field of view.

The following describes a method for setting up the interior layout of the aircraft cabin.

The interior layout 10 is assumed to initially be in the configuration shown in FIG. 1. In this configuration, the first and second flat tabletop parts 62, 63 are in a joined position and in a high seating position, the securing mechanism 100 is in its secured position, the locking mechanism of each leg 26 is in a locked position. The chair 130 is in a lateral position and in a main aisle clearance position.

When an occupant wishes to sit on the couch 128 without compelling another occupant of the couch 128 to stand up from the couch 128 to open a passageway for him or her, the occupant places the securing mechanism 100 in a disengaged position. The occupant then controls the longitudinal actuators 70A of each table part 50, 52 via the respective first control elements 92 so as to move the first and second flat tabletop parts 62, 63 into a separate position. The occupant can then move from the main aisle 40 to the auxiliary aisle 66 to sit on the couch 128.

When an occupant wishes to use the bed 120, the occupant controls the transverse actuators 70B of each table part 50, 52 via the first control elements 92 so as to move the first and second flat tabletop parts 62, 63 away from the couch 128 along the transverse axis B-B'. The occupant then places the locking mechanism of each leg 26 in an unlocked position and controls the vertical actuator 25 via the second control element so as to move the first and second flat tabletop parts 62, 63 into their low safety position. The occupant then returns the locking mechanism of each leg 26 to a locked position. As illustrated in FIG. 7, the occupant can then have a bed 120 in the new space freed above the table 120 between the couch 128 and the chair 130.

When an occupant wishes to arrange the interior layout 10 into TTOL configuration, the occupant controls the transverse actuators 70B of each table part 50, 52 via the first control elements 92 so as to move the first and second flat tabletop parts 62, 63 away from the couch 128 along the transverse axis B-B'.

The occupant then places the locking mechanism of each leg 26 in an unlocked position and controls the vertical actuator 25 via the second control element so as to move the first and second flat tabletop parts 62, 63 into their low safety position. The occupant then returns the locking mechanism of each leg 26 to a locked position. The occupant can then occupy the couch 128 and, for example, buckle in with a (non-illustrated) seat belt. In particular, the occupant can occupy central places on the couch 128 during the TTOL phase. The occupant's legs are then free and they can safely undergo, for example, a taxiing, take-off or landing phase of the aircraft.

When an occupant wishes to sit on the chair 130 while facing another occupant sitting on the couch 128, that person rotates the chair 130 about the base 28 to move it into its main aisle occupancy position.

When an occupant is seated on the chair 130 in the main aisle occupancy position and wishes to vacate the main aisle, he or she leaves the chair 130 and rotates it about base 28 to move it to its main aisle clearance position.

When an occupant of the chair 130 wishes to move closer to the couch 128, that person moves the chair 130 into the meeting position so that it can be moved closer to the couch 128. In the meeting position, the occupant sitting on the chair 130 is thus closer to another passenger sitting on the couch 128. In the meeting position, he also shares a larger field of view with the other passenger so that they can both observe the same object, for example, a screen.

The occupant can also adjust the position of the chair 130 in translation and rotation relative to the guide ring 139 by manipulating the first and second levers 160, 162 of the movement support 145.

In particular, the occupant can move the chair 130 by manipulating the second lever 162 so as to adjust the height position of the chair 130 along the vertical axis C-C'. When the occupant sits on the chair 130, the free end of the support rod 132 rests on the floor 12. The chair 130 is thus stabilised and fixed in position relative to the floor 12.

The present disclosure provides an interior layout whose elements can be easily adjusted in many degrees of freedom. Such an interior layout allows the occupants of the aircraft to easily adapt it to their needs and wishes.

According to an alternative embodiment shown in the figures, the horizontal translation device 70 does not comprise an actuator. According to this variant, the horizontal translation device 70 comprises a longitudinal guide lever connected to at least one longitudinal guide bar 76 and a transverse guide lever connected to at least one transverse guide bar 74.

In one embodiment of the method, when a passenger of the aircraft wishes to move a flat tabletop part 62, 63 or the flat tabletop parts 62, 63 horizontally along the longitudinal axis A-A', the passenger grips the longitudinal guide lever to drive the longitudinal guide bars 76 in translation along the axis A-A'. When a movement along the transverse axis B-B' is desired, the transverse guide lever is grabbed to translationally drive the transverse guide bars 74 in the direction of the axis B-B'.

What is claimed is:

1. An interior layout of an aircraft cabin extending along a longitudinal axis of an aircraft on a floor of the aircraft, the interior layout comprising:
   a table comprising:
      at least one first table part; and
      at least one second table part,
      the at least one first table part comprising:
         at least one first leg;
         at least one first base; and
         at least one first flat tabletop part,
      the at least one second table part comprising:
         at least one second leg;
         at least one second base; and
         at least one second flat tabletop part,
         each at least one first base and at least one second base being configured to be fixed to the floor,
         each at least one first leg and at least one second leg being mounted on a respective at least one first base and at least one second base, each of the first flat tabletop part and the second flat tabletop part being mounted on a respective at least one first leg and at least one second leg, and defining at least one bearing surface, the table defining at least one main aisle accessible to a passenger of the aircraft, the at least one main aisle extending along the longitudinal axis along a longitudinal edge of the at least one flat tabletop part; and at least one seat arranged opposite the table, the at least one seat having a seating direction oriented transversely to the longitudinal axis, each at least one first flat tabletop part and the at least one second flat tabletop part being mounted to be movable translationally on said respective at least one first leg or at least one second leg along the longitudinal axis and along a horizontal transverse axis perpendicular to the longitudinal axis, the at least one first flat tabletop part and the at least one second flat tabletop part being movable between a joined position in which the at least one first flat tabletop part, and the at least one second flat tabletop part are contiguous so as to form a single continuous bearing surface and a separated position, in which the at least one first flat tabletop part and the at least one second flat tabletop part are spaced apart so as to form at least two bearing surfaces separated by at least a space defining at least one auxiliary aisle accessible to a passenger of the aircraft and opening onto the at least one main aisle.

2. The interior layout according to claim 1, wherein the at least one bearing surface extends along the longitudinal axis.

3. The interior layout according to claim 2, wherein a length of the at least one bearing surface, taken along the longitudinal axis, is greater than a width of the at least one bearing surface, taken along an axis perpendicular to the longitudinal axis.

4. The interior layout according to claim 1, wherein the at least one seat is a couch extending along the longitudinal axis along a fuselage of the aircraft, the couch having a seating direction oriented perpendicular to the longitudinal axis.

5. The interior layout according to claim 1, wherein each of the at least one first flat tabletop part and the at least one second flat tabletop parts comprises:

at least one longitudinal actuator configured to move the respective at least one first flat table top part or at least one second flat tabletop part of said at least one first flat tabletop part or at least one second table part in translation along the longitudinal axis of the aircraft relative to the respective at least one first or at least one second leg, and at least one transverse actuator configured to move the respective at least one first flat tabletop part or at least one second flat tabletop part of said at least one first or at least one second table part in translation along the transverse axis relative to the respective at least one first leg or at least one second leg.

6. The interior layout according to claim 1, wherein each of the at least one first leg and the at least one second leg is mounted so as to be translatable on the respective at least one first base and at least one second base along a vertical axis perpendicular to the longitudinal axis, the at least one first flat tabletop part and the at least one second flat tabletop part being translatable along the vertical axis between a high seating position in which the at least one first flat tabletop part and the at least one second flat tabletop part is vertically spaced from the at least one seat along the vertical axis and a low safety position in which the at least one first flat tabletop part and the at least one second flat tabletop part extends below the high seating position, in a space for receiving an occupant of the at least one seat defined when the at least one first flat tabletop part and the at least one second flat tabletop part is in the high seating position.

7. The interior layout according to claim 6, wherein the table comprises at least one vertical actuator configured to move the at least one first leg and the at least one second leg of the table along the vertical axis relative to the at least one first base and the at least one second base.

8. The interior layout according to claim 1, wherein the at least one seat is movable between:

a main aisle occupancy position in which the at least one seat extends substantially into the at least one main aisle, and a main aisle clearance position in which the at least one seat extends away from the at least one main aisle.

9. The interior layout according to claim 1, wherein the at least one seat comprises:

a chair;

a support rod carrying the chair; and a lower connecting arm for connection to the at least one base of the table, the support rod being mounted on a free end of the lower connecting arm.

10. The interior layout according to claim 9, wherein the lower arm is rotatably mounted on said at least one base, around said at least one base.

11. The interior layout according to claim 9, wherein the position of the chair relative to the support rod is adjustable in horizontal translation.

12. The interior layout according to claim 9, in which the support rod is mounted so as to be vertically translatable on the lower connecting arm through the free end of the connecting arm between a lower position in which a lower end of the support rod rests on the floor and an upper position in which the lower end of the support rod is away from the floor.

13. A method for setting up an interior layout of an aircraft cabin comprising:

providing an interior layout according to claim 1, the at least one seat being adapted to be moved between a main aisle occupancy position in which the at least one seat extends substantially into the at least one main aisle, and a main aisle clearance position in which the at least one seat extends away from the at least one main aisle;

displacing the at least one seat between the main aisle clearance position and the main aisle occupancy position; and moving the at least one first flat tabletop part and the at least one second flat tabletop part between the joined position and the separated position.

14. The method according to claim 13, the interior layout being such that each of the at least one first leg and the at least one second leg is mounted so as to be translatable on the respective at least one first base and at least one second base along a vertical axis perpendicular to the longitudinal axis, the at least one flat tabletop being translatable along the vertical axis between a high seating position in which the at least one first flat tabletop part and the at least one second flat tabletop part is vertically spaced from the at least one seat along the vertical axis and a low safety position in which the at least one first flat tabletop part and the at least one second flat tabletop part extends below the high seating position, in a space for receiving an occupant of the at least one seat defined when the at least one first flat tabletop part and the at least one second flat tabletop part is in the high seating position, the method further comprising moving the at least one first flat tabletop part and the at least one second flat tabletop part between the high seating position and the low safety position.

15. The method according to claim 13, the interior layout being such that the at least one seat comprises:
a chair;
a support rod carrying the chairs and
a lower connecting arm for connection to the at least one base of the table,
the support rod being mounted on a free end of the lower connecting arm,
the support rod further being mounted so as to be vertically translatable on the lower connecting arm through the free end between a lower position in which a lower end of the support rod rests on the floor and an upper position in which the lower end of the support rod is away from the floor,
the method further comprising moving the support rod between the lower position and the upper position.

\* \* \* \* \*